March 12, 1940. W. A. PORTER 2,193,040
METHOD OF AND MEANS FOR MANUFACTURING PIPES
OF FIBROCEMENT AND LIKE MATERIAL
Filed Oct. 11, 1937 4 Sheets-Sheet 1

Inventor
William A. Porter
By [signature]
Atty.

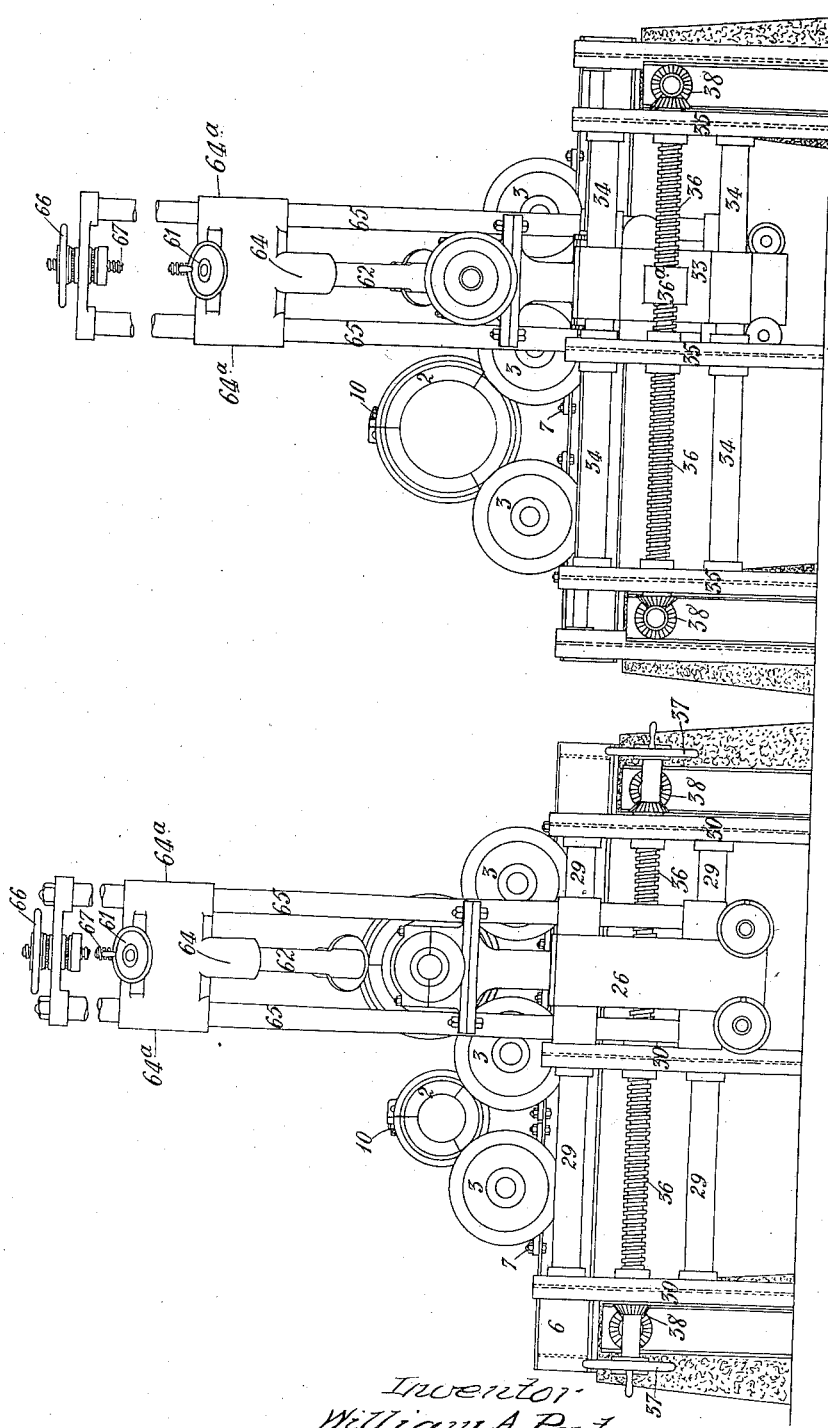

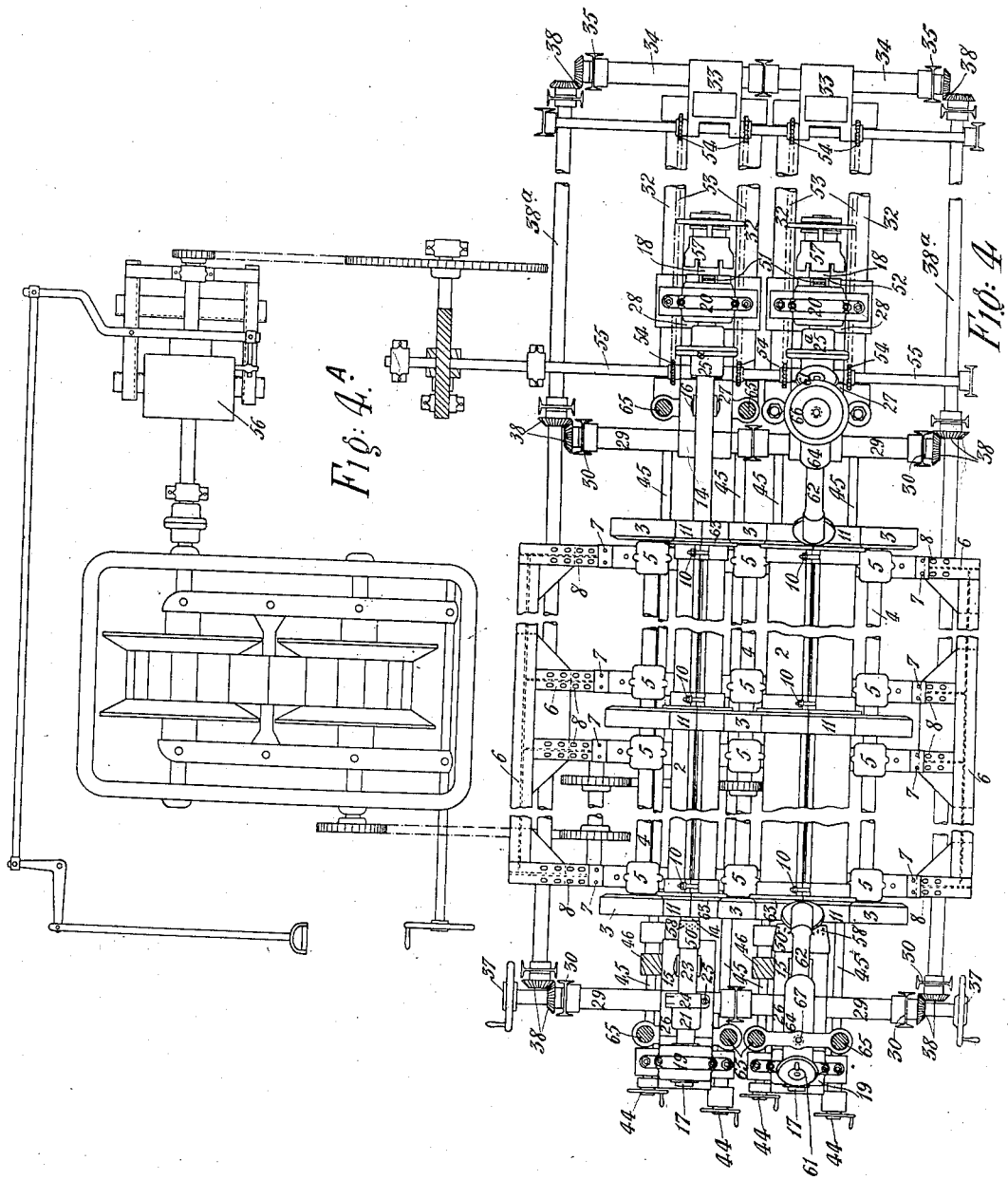

March 12, 1940.   W. A. PORTER   2,193,040
METHOD OF AND MEANS FOR MANUFACTURING PIPES
OF FIBROCEMENT AND LIKE MATERIAL
Filed Oct. 11, 1937   4 Sheets—Sheet 4
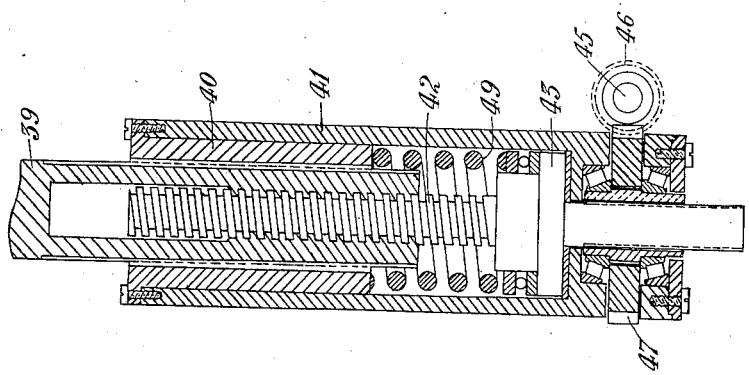
Fig:10.
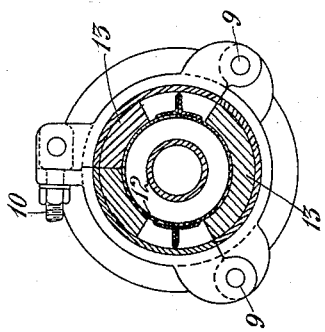
Fig:7.
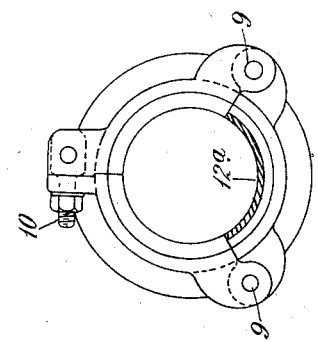
Fig:9.
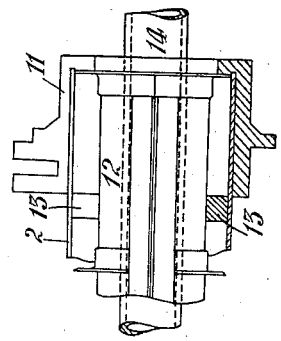
Fig:6.
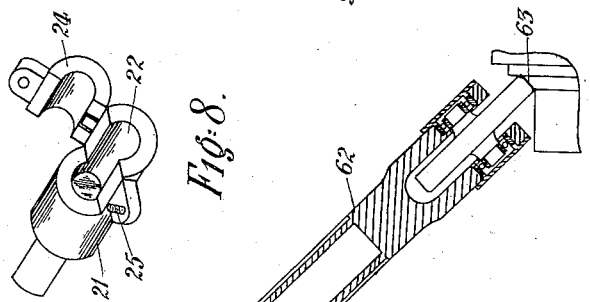
Fig:8.
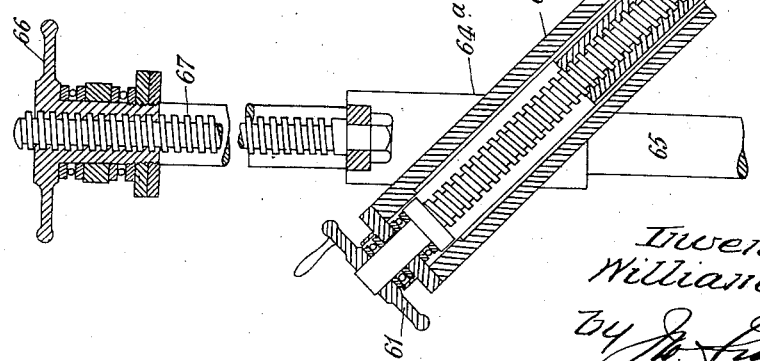
Fig:5.
Inventor
William A. Porter
by Jo Irwin
Atty Patented Mar. 12, 1940

2,193,040

UNITED STATES PATENT OFFICE 2,193,040

METHOD OF AND MEANS FOR MANUFACTURING PIPES OF FIBROCEMENT AND LIKE MATERIALS

William Alfred Porter, Red Hill, Brisbane, Queensland, Australia

Application October 11, 1937, Serial No. 168,497
In Australia October 21, 1936

13 Claims. (Cl. 25—30)

This invention relates to the manufacture of pipes from preformed sheets of material. The invention is chiefly applicable to the manufacture of pipes from preformed sheets of fibrocement, in connection with which it is hereinafter described, but it will be obvious to the technician that it may well be applied to other sheet material which can be reduced to the plastic state.

In the industry it is recognized that the manufacture of a pipe in an external mould, and the lining of a pipe with plastic material (in which case the pipe forms a mould), are equivalent operations, and consequently the invention may be applied to the lining of pipes with sheet material.

In the manufacture of fibrocement pipes, two methods have been in general use in the past. In one method (generally termed the "Eternit" method) a mass of plastic material is gradually built up to the required thickness about a collapsible mandrel. The pipe must then be permitted to dry or cure on the mandrel, which is therefore out of service for a considerable period. Moreover, according to this method, the built-up material is compacted by rollers acting on the outer surface of the pipe, which causes a bulging and distortion of the pipe on the mandrel, resulting in an inaccurate finished pipe. In the other usual method, a preformed sheet is wound about a mandrel, either helically or squarely, and the sheet is compacted on the mandrel by means of a rope wound tightly about the outer surface of the pipe. In this case also the pipe is permitted to dry on the mandrel, which is out of service for the drying period. Moreover, the compacting rope results in a ridged outer surface on the pipe, which is an undesirable feature.

Mandrels are expensive items, and it is very uneconomical to have them out of service for long periods, in addition to which many such mandrels are required to maintain continuous production of pipes. Furthermore, a supply of such mandrels is required for each different size of pipe to be produced.

The object of this invention is to provide an improved method for the formation of pipes from preformed sheet material, such as fibrocement, and with this method but one mandrel is necessary for the continuous production of pipes in one machine. Furthermore, the pipe is more accurately formed to the exact external diameter, is compacted to a higher degree, is smoother externally and internally, and is generally simpler and cheaper to produce, than is the case with known methods.

In accordance with the invention, the sheet is wrapped about a rotatable mandrel which is disposed within the rotating mould, an edge of sheet is brought into contact with the mould, and the sheet is progressively transferred in this manner from the rotated mandrel to the inner surface of the mould to form the pipe in the rough. It is, of course, necessary that the mould be rotated during the transfer period at sufficient speed to cause adhesion of the sheet to its inner surface. The mandrel is rotated during the transfer period, possibly by power, but otherwise by the drag of the sheet adhering to the rotating mould.

The sheet may be of such a size as to provide the number of layers necessary to build up the pipe to the required thickness. If but one layer is used, it is preferred to have the sheet of sufficient size to provide an initial lap joint of the edges of the sheet when in place within the mould.

Although the sheet could be transferred helically from the mandrel to the mould to form a helically wound pipe, it is preferred to transfer the sheet normally on to the surface of the mould. In this latter case the sheet on the mandrel has a length equal to the length of the pipe to be formed therefrom, and the joint in the pipe is parallel to the axis thereof.

The rough pipe, after formation by the application of the sheet to the interior surface of the mould, is compacted and smoothed by dropping (or laterally shifting) the mandrel into contact with its inner surface, and by applying a compacting pressure to the mandrel to roll out the pipe. The mandrel is free to rotate during this rolling operation, and is preferably spring loaded to yield over the high spots and the joint, which are gradually merged into the smooth and accurate inner diameter of the pipe. If necessary, additional water may be added to keep the pipe at the required degree of plasticity during rolling.

If desired, the mandrel may be dropped at the commencement of the transfer operation, so that it exerts a compacting pressure on the material against the mould during the transfer operation.

After rolling, the mandrel is centralized to the pipe axis, is restrained against rotation, and is retracted through the rotating mould to draw an attached dehydrating head through the pipe. Water, squeezed from the pipe by the head, may be sucked into a bore in the mandrel, and discharged. In addition to dehydrating the pipe, the head swages and smooths the interior of the pipe to the exact diameter with a fine finish. After dehydration, the pipe may be spun for a further period, if desired, to further dry and set the material.

The formed pipe is removed from the mould for final drying and curing, and is suitably supported during such removal. A suitable support is a palette detachable from the mould proper. If an inner mould is employed, it may be removed, with its contained pipe, from the mould carrier.

The mandrel is removed from the mould for a further wrapping for the formation of the next pipe, or alternatively the wrapping may be applied through the opened mould without removal of the mandrel.

In order to fully describe the invention reference is made to the accompanying drawings, which depict a preferred embodiment of the apparatus for carrying out the method, and in which:

Figs. 2 and 3 are elevations from opposite ends thereof.

Fig. 4 is a broken plan view of the apparatus.

Fig. 4A is a diagram of a variable speed driving gear.

Fig. 5 is a cross-sectional view of an adjustable locating bearing for the mould.

Fig. 6 is a fragmentary side elevation, in part cross-section, of an inner mould, and its mounting.

Fig. 7 is an end view, in part cross-section, of the construction of Fig. 6.

Fig. 8 is a perspective view of a detachable coupling for the mandrel.

Fig. 9 is an end view of a mould with a detachable palette, and

Fig. 10 is a longitudinal cross-sectional elevation of the spring-loaded mounting for the mandrel bearing.

Figure 1:
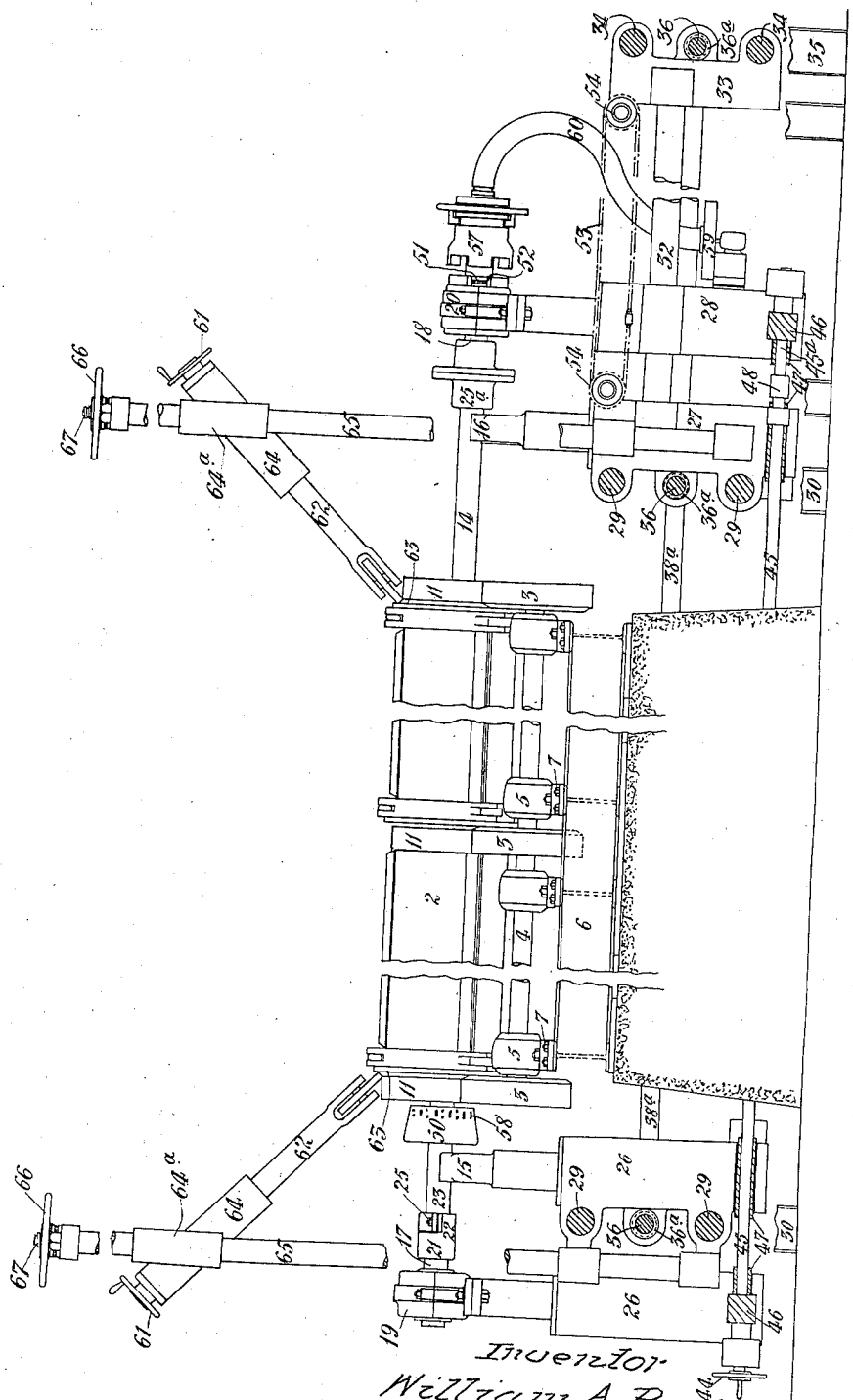
Fig. 1 is a broken side elevation of the apparatus.

Mould casings 2, consisting of cylindrical shells are rotatably carried by roller wheels 3, these wheels are carried on shafts 4 which in turn are supported in bearings 5 carried on the bed 6. The bearings 5 are adjustable laterally by means such as holding down bolts 7 fitting in either of the holes 8 in the bed 6, or by other suitable means, so that pipes of different diameters may be manufactured.

One or more mould casings 2 may be employed and supported upon the bed 6 as described, in order that one or more pipes may be made at the same time.

Two different diameter mould casings are shown in the drawings; the mould casings 2 are preferably made in three sections connected by hinges 9, so that they can be easily opened to permit of the fibrous cementitious material to be fed to the mandrels (hereinafter described) and/or to allow the mandrels with the material wrapped thereon, to be placed in position and to permit of the removal of the finished pipes.

Swing bolts and nuts 10 or other means are provided for readily and securely fastening the sections of the mould casings during operation, tracks 11 are provided on the mould casings 2 to keep the same in position longitudinally, and also to take the wear as the mould casings rotate on the roller wheels 3.

Moulds 12, which are formed in and carried by the mould casings 2, are also made in sections for the reasons already stated in relation to the mould casings 2. These moulds 12 are shown in the drawings in two sections (but more sections may be used) which are kept in place by segments 13 secured on the inside of the mould casings 2, the whole or the bottom section of the moulds 12 is removable with the finished pipe thereon to facilitate rapid and economic manufacture.

In some instances, to lower the cost of manufacture, the moulds 12 may be omitted, the mould casings 2 being used as moulds, in which case a false bottom 12a may be let into the mould casings to provide for ready removal of the finished pipe.

The mould casings 2 and the moulds 12 are rotatable by direct belt or other drive, or by frictional contact of the tracks 11 with the roller wheels 3, and provision is made by which the speed of rotation may be varied as desired, by the use of variable speed gear such as illustrated in Fig. 4a or by other suitable means.

The mandrels 14 which are hollow, or partly hollow, are normally carried by the open bearings or rests 15 and 16 (or bearings with readily removable caps) but when the mandrels are rotated during the operation of transferring the fibrous cementitious material from the mandrels to the moulds, the said mandrels are connected to the stub shafts 17 and 18 at the respective ends of the machine, and which are carried in the bearings 19 and 20; the couplings 21 are secured to the ends of the stub shafts 17 and are formed with half round portions 22 on which the ends 23 of the mandrels rest and on which they are secured as long as required by the caps 24 hingedly carried and secured by bolts 25 or by other suitable means: the other ends of the mandrels are connected to the hollow stub shafts 18 by couplings of known design 25a or by any suitable means.

The bearings 15 and 16 and bearings 19 and 20 are supported upon the bases or pedestals 26, 27 and 28; as already mentioned the bearings carrying the shafts 4 and the roller wheels 3 are adjustable as to position according to the diameter of the pipes to be manufactured, consequently, the positions of the mandrels 14 would require to be altered both horizontally and vertically; for the former purpose the bases or pedestals 26 and 27 are slidably carried on the rods 29 supported by the uprights 30 and the base or pedestals 28 are slidably carried on the rods 32 supported by the bases or pedestals 27 and 33, the base 33 is in turn slidably carried by the rods 34 supported by uprights 35.

The bases 26, 27 and 28, and the bases or pedestals 33 are moved into the desired position by the threaded rods 36 working in the internally threaded bushes 36a which are secured in the bases or pedestals 26, 27 and 33; hand wheels 37 and bevel wheels 38 fitted to the shafts 38a are provided for operating the bases or pedestals in unison.

The bearings 15 and 16 and the bearings 19 and 20 are adjustably carried in their respective bases or pedestals so that they may be raised or lowered as required; to enable this to be done the bearings are carried on the internally threaded shanks 39 and the shanks are slidably carried in the bushes 40 and prevented from turning therein by keys and keyways, these bushes are secured in the bosses 41 of the bases or pedestals 26, 27 and 28.

The threaded rods 42 which are screwed into the shanks 39 are operated by hand wheels 44, shafts 45, worms 46, worm wheels 47, and the said rods 42 are prevented from moving endwise by the collars 43, and buffer springs 49 which are provided in the bosses 41 to ensure efficient operation and to take up jars.

It is preferred that internally feathered or like couplings 48 be fitted to the shafts 45 between the bases or pedestals 27 and 28, so that when the pedestals 28 are moved, longitudinally, on the slide rods 32, shaft 45a disengages the said coupling 48 and engages the coupling when returned to its normal operating position.

Supplementary pressure, in addition to that obtained by centrifugal force, is provided by the movement of the mandrels 14 longitudinally or radially closer to the mould casings 2; in the radial case, the movement is attained by adjusting the bearings 19 and 20 and possibly the bearings 15 and 16; in the longitudinal case, tapered formers or trowels 50 are fitted to the mandrels 14, these formers or trowels, when in position for manufacturing the pipes in the preliminary stage, are just beyond the ends of the mould casings 2; the outside diameter of the formers or trowels are of the same diameter as the internal diameter of the moulded pipe.

The bearings 20 function alternately as thrust bearings 51, against which the shoulders 52 on the hollow stub shafts 18 operate, so that when the bases or pedestals are moved longitudinally, the mandrels 14 are drawn through the pipes during manufacture, the mandrels being first uncoupled from the stub shafts 17: the formers or trowels 50 thus additionally compress the material.

The bases or pedestals 28 are moved by the endless sprocket chains 53 passing round the sprocket wheels 54 on the bases or pedestals 27 and 33 or by other suitable means.

The shafts 55 carrying the sprocket wheels 54 are driven from a source of power supply and controlled by suitable hand-controlled operating mechanism, such as 56. The mandrels 14 are prevented from rotating when desired, by the dog clutches 57, or by other suitable means. The mandrels 14 are hollow, or partly hollow, as before stated and orifices 58 are provided in the tapered formers or trowels 50, to enable surplus moisture to be drawn from the mixture by the pumps 59, which are driven from any source of power supply and which are connected by flexible pipes 60 to the hollow stub shafts 18.

To prevent endwise movement of the mould casings 2 and the moulds 12, hand wheels 61, screw operated arms 62, provided with antifriction rollers are arranged to engage the shoulders 63, on the tracks 11, connected to the mould casings 2.

The arms 62 are carried in sleeves 64, connected to bosses 64a, said bosses are carried on vertical rods 65 which are supported in the bases or pedestals 26 and 27; the bosses 64a are adjusted by the hand wheels 66 and the screw operated adjustment 67.

The formation of a pipe in accordance with this invention is carried out as follows:

The preformed sheet (or joined sheets) of (say) fibrocement, of the correct length and width to form the length, diameter and thickness of the required pipe, is brought to the plastic condition, as by wetting. The sheet is wound about the mandrel 14, which may be retracted from the mould and removed from its bearings for this purpose, or which may be in position within the mould, which is in this case opened to give access to the mandrel. If it has been retracted or removed, the mandrel is then replaced through the mould, and in its bearings 19 and 20, or if the mandrel has not been retracted or removed, the mould is closed.

The pipe may be formed in the mould 2 as the outer mould, or alternatively, the inner mould 12 may be employed. The mould is spun and the freely rotatable mandrel is turned by hand to cause one edge of the sheet about the mandrel to drop onto and engage with the rotatable mould. The speed of rotation of the mould during this transference stage is preferably no higher than is necessary to engender sufficient centrifugal force to cause sufficient adhesion between the sheet and the mould to cause the sheet to be drawn off the mandrel and to remain in contact with the inner surface of the mould in all positions. As the sheet is drawn off the mandrel and applied to the inner surface of the mould, the mandrel is rotated by the pull of the material, but some assistance may be given to the mandrel rotation. In order to reduce friction on the mandrel rotation, the bearings 15 and 16 may be dropped clear of the mandrel during this stage of the process.

An alternative method of transference is to drop the loaded mandrel on to the mould, so that the mandrel applies pressure on the sheet as the transference takes place.

It is usual to have the sheet of sufficient size to form a lap joint along the length of the pipe. If necessary, the sheet is of such a size as to form the number of layers required to build the pipe up to the required thickness.

The pipe having been formed in the rough, the mandrel bearings are dropped to cause the mandrel to roll freely on the pipe in the rotating mould. The required "positive" rolling pressure is applied through bearings 19 and 20. The expression "positive" rolling pressure is intended to mean a pressure in excess of that due to the weight alone of the mandrel. The spring loading of bearings 19 and 20 permits the mandrel to yield, against the spring pressure, to ride over and gradually roll down high spots and the lap joint. If the rough pipe is not sufficiently plastic during the rolling operation, additional water may be added.

The mandrel is then centralized on the pipe axis, and bearings 15 and 16 are engaged with it. Coupling 21 is released, freeing the mandrel from bearing 19, dog clutch 57 is engaged to restrain the mandrel against rotation, suction pump 59 is put into operation, and shaft 55 is rotated to gradually retract pedestal 28 and so draw the smoothing and dehydrating cone 50 through the pipe interior. The pipe is rotated during this operation, but it is preferred that the cone does not rotate. The mandrel is supported centrally of the pipe by bearing 15 until cone 50 has fully engaged in the end of the pipe.

The cone smooths the interior of the pipe, further compacts it, and swages it to the exact internal diameter required. During its passage through the pipe, the cone forces ahead of its base, water from the material, which can be sucked through apertures 58 and thence through the mandrel bore, to a discharge point. After smoothing and dehydration, the pipe may be spun at high speed for a short period for further drying and settling.

The mould is then stopped, the mandrel is retracted clear of the mould, and the finished pipe is removed. If no inner mould is used, the pipe is removed on palette 12a, and if the inner mould 12 is employed, this inner mould, or at least one-half thereof, is used to support the soft pipe.

What I claim as my invention, and desire to secure by Letters Patent is:

1. A process for the manufacture of pipes from preformed sheet material, according to which the sheet, in the plastic state, is mounted on a mandrel which is disposed longitudinally within a mould, the mould is rotated, the edge of the sheet is brought into contact with the inner surface of the rotating mould, and the sheet is transferred from the mandrel to inner surface of the mould to form the pipe.

2. A process according to claim 1, in which the mandrel is rotated during the transference of sheet from the mandrel to the mould.

3. A process according to claim 1, in which the mandrel has clearance from the sheet at the point of initial contact of the sheet with the mould.

4. A process according to claim 1, in which the sheet is subjected to a rolling pressure between the mandrel and the mould during the transference of the sheet from the mandrel to the mould.

5. A process according to claim 1, in which the sheet, after transference to the inner surface of the mould to form the rough pipe, is subjected on its inner surface to a compacting pressure throughout its length.

6. A process according to claim 1, in which the pipe is internally smoothed by drawing a head through the pipe.

7. A process according to claim 1, in which the pipe is internally smoothed and partially dehydrated by drawing a head through the pipe whilst the pipe is rotating.

8. A process according to claim 1, in which the preformed sheet is wound about the mandrel prior to the insertion of the mandrel in the mould.

9. A process for the manufacture of pipes from preformed sheet material, according to which the sheet, in the plastic state, is mounted upon a mandrel which is disposed longitudinally within a mould, the mould is rotated, the edge of the sheet is brought into contact with the inner surface of the rotating mould, the sheet is transferred from the mandrel to the inner surface of mould to form a rough pipe with a longitudinal lap joint, the inner surface of the rough pipe is subjected to a compacting pressure exerted simultaneously throughout its length, and the pipe is internally smoothed by a head drawn through the rotating pipe.

10. Apparatus for the manufacture of pipes from preformed sheet material in the plastic state, comprising a rotatable cylindrical mould, a rotatable mandrel disposable through the interior of the mould to support the plastic sheet prior to and during its application to the mould, means for vertically adjusting the mandrel for the purpose of applying a rolling pressure to the sheet within the mould, and a smoothing head secured on the mandrel and adapted to be drawn by the mandrel through the pipe.

11. Apparatus according to claim 10, and wherein the smoothing head is in the form of a truncated cone having a greatest diameter equal to the required internal diameter of the pipe.

12. Apparatus according to claim 10, wherein the smoothing head is in the form of a truncated cone having a greatest diameter equal to the required internal diameter of the pipe, and including means for withdrawing the mandrel axially to draw the head through the pipe.

13. Apparatus according to claim 10, wherein the mandrel is hollow, and wherein the smoothing and dehydrating head is in the form of a truncated cone having dehydrating apertures in the head in communication with the interior of the mandrel, and a suction pump coupled to the mandrel to withdraw moisture from the pipe through the head dehydrating apertures and the interior of the mandrel.

WILLIAM ALFRED PORTER.